2 Sheets--Sheet 1.

D. C. BROWN.

Wire-Heddle for Looms.

No. 6,547. Reissued July 20, 1875.

*Witnesses:*

Thomas B. Connolly
Ulysses G. Whitt.

*Inventor:*

D. C. Brown

D. C. BROWN.

Wire-Heddle for Looms.

No. 6,547. Reissued July 20, 1875

Witnesses:

Thomas L. Connolly

Ulysses G. White

Inventor:

D. C. Brown

UNITED STATES PATENT OFFICE.

DARIUS C. BROWN, OF LOWELL, MASSACHUSETTS.

IMPROVEMENT IN WIRE HEDDLES FOR LOOMS.

Specification forming part of Letters Patent No. 64,944, dated May 21, 1867; reissue No. 6,547, dated July 20, 1875; application filed July 12, 1875.

*To all whom it may concern:*

Figure 1:
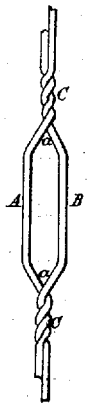
Figure 2:
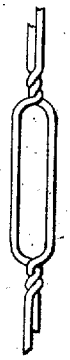
Figure 3:
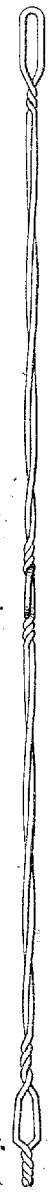
Figure 4:
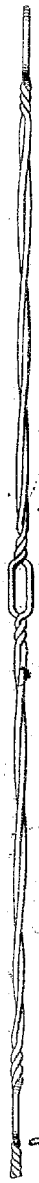

Be it known that I, DARIUS C. BROWN, of Lowell, Massachusetts, have invented a Wire Heddle for Loom-Harnesses, of which the following is a specification:

Figure 1 shows part of a wire heddle, having a warp-eye, as generally made prior to my invention. Fig. 2 shows the improved part of my new heddle. Figs. 3 and 4 show my new heddle as completed.

My invention consists in a new wire heddle for loom-harnesses, having its warp-eye so constructed and compressed as to furnish a better path for the warp-thread, thereby preventing such thread catching or chafing in passing through the eye.

All that part of my new heddle, excepting that part of the wires forming the warp-eye, and the joint or union of those wires at each end of said eye, is made substantially like those wire heddles which were in common use, and so well known, prior to my invention, as to make a more full description of it unnecessary.

I make my new heddle with parallel sides, extending nearly the entire length of the warp-eye. I bring the two wires together at each end of this eye to form a suitable bed or path for the warp-thread to draw over while passing through the eye. This form may be, as shown in the drawings filed herewith, Fig. 2, of a semicircle, or any angle approximating thereto. At the junction of these two wires, or sections of wire, I make a tight close twist, the plane of which, at this point, shall be as slightly inclined from a right angle with the length of the heddle as it is practicable to make it with the wire used, and have the twist so firm as to prevent the warp-thread opening the wires at this point or become wedged between them. Such form of eye furnishes a free path for the warp-thread at each extreme end of the eye, while the peculiar twist so compresses and holds the wires together, as to make a bed for the finest warp-thread to pass over without chafing or catching. By this construction I overcome the serious objections of those wire heddles made prior to my invention.

I claim—

1. In a wire heddle for loom-harnesses a warp-eye having at each or either end the rigidly-compressed twist as herein described, for the purposes set forth.

2. A wire heddle for loom-harnesses, havin the free bed and path, and the rigidly-compressed twist, herein described, at each or either end of said warp-eye, as and for the purposes shown and stated.

DARIUS C. BROWN.

Witnesses:

THOMAS C. CONNOLLY.
ULYSSES G. WHITE.